(12) United States Patent
Drieux et al.

(10) Patent No.: US 6,688,354 B2
(45) Date of Patent: Feb. 10, 2004

(54) TIRE COMPRISING A REINFORCING PROFILED ELEMENT IN AT LEAST ONE SIDEWALL, AND TIRE/RIM ASSEMBLY COMPRISING SUCH A TIRE

(75) Inventors: Jean-Jacques Drieux, Volvic (FR); Jean-Claude Faure, Mozac (FR); Jean-Pierre Pompier, Greenville, SC (US)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 10/301,084

(22) Filed: Nov. 21, 2002

(65) Prior Publication Data

US 2003/0106625 A1 Jun. 12, 2003

Related U.S. Application Data

(63) Continuation of application No. PCT/EP01/05459, filed on May 14, 2001.

(30) Foreign Application Priority Data

May 22, 2000 (FR) .............................. 00 06598
May 26, 2000 (FR) .............................. 00 06876

(51) Int. Cl.$^7$ .............................. B60C 3/06; B60C 9/02; B60C 15/00; B60C 15/024; B60C 17/00; B60C 17/04
(52) U.S. Cl. .................... 152/158; 152/454; 152/456; 152/517; 152/544; 152/547; 152/552; 152/DIG. 6
(58) Field of Search ................... 152/517, 516, 152/158, 456, DIG. 6, 539, 544, 552, 547, 454, 548

(56) References Cited

U.S. PATENT DOCUMENTS

| | | |
|---|---|---|
| 3,935,892 A | 2/1976 | Arimura et al. |
| 5,785,781 A | 7/1998 | Drieux et al. |
| 5,836,366 A | 11/1998 | Muhlhoff |
| 5,971,047 A | 10/1999 | Drieux et al. |
| 6,179,028 B1 | 1/2001 | Drieux et al. |

FOREIGN PATENT DOCUMENTS

| | | |
|---|---|---|
| FR | 2234148 | 1/1975 |
| FR | 2548095 | 1/1985 |
| GB | 1456215 | 11/1976 |
| GB | 2061199 | 5/1981 |
| WO | 9523073 | 8/1995 |
| WO | 0041467 | 7/2000 |

*Primary Examiner*—Adrienne C. Johnstone
(74) *Attorney, Agent, or Firm*—Baker Botts L.L.P.

(57) ABSTRACT

A tire having a radial carcass reinforcement winding within each bead around at least one heel reinforcement element and whose meridian profile, when the tire is mounted and inflated, has a constant direction of curvature in a first bead and a sidewall extending it radially, and has a tangent TT' to the point of tangency T of the carcass reinforcement profile with the annular element of the first bead which forms with the axis of rotation an angle φ which is open towards the outside and is greater than 45°, wherein, viewed in meridian section, at least the aforesaid sidewall comprises a reinforcing profiled element having, viewed in section, substantially the form of a crescent, one of the axially inner or outer faces of the crescent-shaped profiled element follows the profile of the carcass reinforcement, and the trace of the face of the crescent-shaped profiled element opposite the face of such profiled element closest to the carcass reinforcement has a single direction of curvature.

21 Claims, 5 Drawing Sheets

TIRE COMPRISING A REINFORCING PROFILED ELEMENT IN AT LEAST ONE SIDEWALL, AND TIRE/RIM ASSEMBLY COMPRISING SUCH A TIRE

CROSS REFERENCE TO RELATED APPLICATIONS

This is a continuation of international application PCT/EP 01/05459 filed May 14, 2001, which was published in French on Nov. 29, 2001 as international publication WO 01/89861.

BACKGROUND OF THE INVENTION

1. The Field of the Invention

The present invention relates to a tire intended to be mounted on a rim having at least one first frustoconical seat, the generatrix of which has an axially outer end which is closer to the axis of rotation than the other, axially inner, end. It also relates to a mounted assembly comprising such a tire mounted on a rim.

2. The Related Art

Such a tire is described in the commonly owned U.S. Pat. No. 5,785,781. It comprises at least one first bead, which is intended to be mounted on a first rim seat which is inclined towards the outside. The first bead is of conventional axial width, ends axially to the outside in a bead toe and has a bead seat, the generatrix of which has its axially outer end closer to the axis of rotation than its axially inner end. The generatrix is extended axially to the outside by an outer face defining the bead toe, such face forming with the axis of rotation an angle γ, open radially and axially towards the outside, of less than 90°. The radial carcass reinforcement of the tire is anchored within each bead to at least one inextensible annular reinforcement element and has a meridian profile, when the tire is mounted on its operating rim and inflated to its operating pressure, with a direction of curvature which is constant at least in the sidewall extending the bead which ends in the toe and which is such that, in the bead, the tangent to the point of tangency of the profile with the inextensible annular element of the bead forms with the axis of rotation an angle φ, which is open towards the outside, of at least 70°.

The bead of such a tire, and more particularly the structure of the hooking of the carcass reinforcement, may be variable. In the aforementioned United States patent, the carcass reinforcement is anchored to an inextensible annular reinforcement element (generally a coated bead wire) in conventional manner, that is to say, by winding the reinforcement around the element to form an upturn starting from the base of the element and rising radially towards the outside.

In this type of tire, the bead structures may be established in order to permit modification (increase) of the clamping of the bead toe on the mounting rim according to the tension of the carcass reinforcement, which results in having initial clamping on the rim of low value, knowing that the clamping will increase when the tire is inflated to its recommended pressure. These bead structures, when the conditions of travel of the tire are such that the beads are brought to high temperature, and at the end of their life, have deficiencies in terms of endurance which result from a certain unwinding of the carcass reinforcement from around the annular reinforcement element of the bead heel, linked with a reduction in the clamping, in particular when the upturn of the carcass reinforcement is short.

In order to overcome these drawbacks, there has been proposed in commonly-owned international patent application No. PCT/EP 99/10471 a novel tire comprising at least one first bead, the seat of which has a generatrix, the axially inner end of which lies on a circle of diameter greater than the diameter of the circle on which the axially outer end is located, the bead heel being axially to the inside. The toe of the bead is axially to the outside. A radial carcass reinforcement winding within each bead extends around at least one inextensible annular heel reinforcement element which is coated with rubber mix, passing from the inside to the outside to form an upturn, extending into a profiled element of rubber mix in the form of a wedge defined by two sides coming from an apex A which is located beneath the section of the annular element. The rubber mix forming the profiled element, axially adjacent to the annular element, has a Shore A hardness greater than the Shore A hardness(es) of the rubber mixes respectively radially above the element and the axially adjacent profiled element. Furthermore, when this tire is mounted on its operating rim and inflated to the recommended pressure, the meridian profile of the carcass reinforcement has a constant direction of curvature in the first bead and the sidewall extending it radially and has a tangent TT' to the point of tangency T, of the profile with the annular element of the first bead which forms with the axis of rotation an angle φ, which is open towards the outside, and is between 45° and 70°.

In this latter tire bead structure, the inclination of thee carcass reinforcement at the connection with the inextensible annular reinforcement element results in an increase in the axial component of the force exerted by the reinforcement on the annular reinforcement element and makes it possible effectively to increase the clamping of the carcass reinforcement under the annular reinforcement element. However, the fact of using an angle of opening of the carcass reinforcement of between 45° and 70° to the point of tangency with the annular element may result, in use, in problems of attack at the level of the outer surface of the tire in the region of the sidewalls thereof. In particular, and compared with the tire structure described in U.S. Pat. No. 5,785,781, for which the angle formed by the carcass reinforcement at the point of tangency with the inextensible annular element of the beads is greater than 70°, the structure described in the aforementioned international application No. PCT/EP 99/10471 results in having sidewalls which are more exposed to various scratching and friction phenomena which adversely affect the aesthetic appearance thereof and may also adversely affect the integrity of the tire. To these attacks of the scratching type there have to be added the impacts to which the sidewalls in accordance with this last described structure are subjected and which may adversely affect the integrity of said sidewalls, including that of the carcass reinforcement.

SUMMARY OF THE INVENTION

The tire, according to the invention and viewed in meridian section, comprises at least a first bead, the seat of which has a generatrix, whose axially inner end lies on a circle of diameter greater than the diameter of the circle on which the axially outer end is located, the bead heel being axially to the inside, whereas the bead toe is axially to the outside, and a radial carcass reinforcement winding within each bead around at least one inextensible, annular heel reinforcement element. The carcass reinforcement winding is coated with rubber mix, and passes from the inside to the outside to form an upturn, extending into a profiled element of rubber mix in the form of a wedge having a Shore A hardness greater than the Shore A hardness(es) of the rubber mixes respectively radially above said element and the axially adjacent profiled element. The meridian profile of the carcass reinforcement, when the tire is mounted on its operating rim and inflated to the recommended pressure, has a direction of curvature which is constant in the first bead and the sidewall extending it radially, and has a tangent TT' to the point of tangency T of the profile with the annular heel-reinforcement element of the first bead which forms with the axis of rotation an angle φ which is open towards the outside of between 45° and 70°, such tire being characterized in that, viewed in meridian section:

at least the sidewall extending the first bead comprises a profiled element having, viewed in section, substantially the form of a crescent defined by an inner face and an outer face, the profiled element extending between a point P1 and a point P2, the point P1 being located at a distance R1 greater than the external radius Rte of the annular bead element and less than the radius R0 of the circle on which are located the points of the carcass reinforcement axially most to the outside of the tire mounted on its rim and inflated to its use pressure, the point P2 being located at a distance R2 greater than the radius R0, the distances R1 and R2 being measured perpendicular to the axis of rotation of the tire;

one of the inner or outer faces of the profiled element follows the profile of the carcass reinforcement; and the trace of the face of the profiled element opposite the face of the profiled element closest to the carcass reinforcement has a single direction of curvature.

The profiled element may equally well be placed axially towards the outside or towards the inside of the carcass reinforcement in the sidewalls. Preferably, the angle formed by the tangent to the point PI on that face of the profiled element which is opposite the face closest to the carcass reinforcement with the tangent TT' is, in absolute value, greater than or equal to 20°, so as to impart appropriate rigidity to the sidewall and to have a sufficient thickness to protect the sidewall from attack.

Apart from the beneficial role with respect to attack on the sidewalls which is played by the presence of a profiled element in the sidewalls, a beneficial influence is noted on the resistance of the tire according to the invention when the latter is subjected to travel at very low or even zero inflation pressure. In fact, the addition of at least one profiled element of suitable thickness, coupled with the carcass reinforcement (that is to say linked to this reinforcement by a rubber mix), stiffens the sidewall in the radial direction and substantially reduces the loading deformations at fixed load when the pressure is zero. This makes it possible to increase running capacity under these particular/exceptional conditions, in particular even before a bearing support comes into operation to bear the load.

Complementarily, a tire has been produced in accordance with the description of the commonly-owned U.S. Pat. No. 5,785,781; that is, to say a tire comprising at least one first bead, the seat of which has a generatrix, the axially inner end of which lies on a circle of diameter greater than the diameter of the circle on which the axially outer end is located, and a carcass reinforcement, the meridian profile of the carcass reinforcement, when the tire is mounted on its operating rim and inflated to its operating pressure, having a direction of curvature which is constant at least in the sidewall extending said first bead and which is such that, in said bead, the tangent to the point of tangency of said profile with the inextensible annular element of the bead forms with the axis of rotation an angle φ which is open towards the outside of at least 70°, to which there has been added:

in at least the sidewall extending the first bead, a profiled element having, viewed in section, substantially the form of a crescent defined by an inner face and an outer face, the profiled element extending between a point P1 and a point P2, the point P1 being located, relative to the axis of rotation, at a distance R1 greater than the external radius Rte of the annular bead element and less than the radius R0 of the circle on which are located the axially outermost points of the carcass reinforcement of the tire mounted on its rim and inflated to its use pressure, the point P2 being located at a distance R2 greater than the radius R0, the distances R1 and R2 being measured perpendicular to the axis of rotation of the tire, one of the—inner or outer—faces of the profiled element following the profile of the carcass reinforcement and the trace of the face of the profiled element opposite the face of said profiled element closest to the carcass reinforcement having a single direction of curvature.

There was also noticed a particularly noticeable beneficial effect on protection from attack of the sidewalls of the tire when the tire is partly or completely deflated. In fact, in that part of the tire which is adversely affected by loading on the roadway, the sidewalls are subjected to flexing towards the outside which exposes the sidewalls to attack. Since this type of tire is intended for travelling in low-pressure (or even zero-pressure) conditions, there results increased susceptibility to external attack. In order to reduce this susceptibility, it is advantageous to provide for the presence of a profiled element as described previously for angles φ which are open towards the outside of at least 45°.

The profiled element may be made from rubber mix or plastics material which is compatible with the rubber mixes of the tire.

In a preferred variant, the profiled element is covered with a complementary reinforcement armature over at least a part—between P1 and P2—of its face which is axially opposite the face of the profiled element which is closest to the carcass reinforcement, the complementary armature being formed, for example, of one or more plies reinforced by a plurality of cords or cables which are oriented in the same manner in each ply.

So as to ensure satisfactory anchoring of the profiled element, it is advantageous for the complementary reinforcement armature to be extended radially towards the inside beyond the point P1 of the profiled element along the carcass reinforcement in order, for example, to pass radially beneath the annular element.

In practice, and viewed in meridian section, if the point P1 of the radially innermost profiled element is located close to the point of the annular bead element of maximum circumferential development (in practice the radius R1 of the circle on which the point P1 is located is between Rt and (3Rt+Ro)/4), the excess thickness created by this profiled element may sometimes be the cause of additional heating in that part of the tire which is in the vicinity of the annular element: in fact, the additional flexural strength of that part of the sidewall which is connected to the bead results in an increase in the stresses on the bead. In this latter configuration, and in order to avoid an increase in the stresses in the beads, a decoupling groove is produced which is oriented in the circumferential direction, this groove being open axially and radially towards the outside of the first bead. This groove is defined by a radially inner surface and a radially outer surface such that, viewed in section, the point of intersection K of the two surfaces is located at a distance Rri from the axis of rotation of the tire which is substantially equal to R1 so as to permit operation as an articulation substantially about the point P1. The point of intersection K of the radially inner and outer surfaces defining the groove corresponds to the common point of tangency of the surfaces with a straight line perpendicular to the axis of rotation.

"Distance substantially equal to R1" is to be understood to mean a distance which may be less than or greater than R1, the difference between the two distances being less than 20% of R1.

In order to have improved operation when travelling at zero or virtually zero pressure, it is advantageous that, viewed in meridian section, the radially inner surface defining the groove has a point axially and radially to the outside located at a distance from the axis of rotation Rre which is greater than or equal to the distance Rri, and in that the profiles of the surfaces are appropriate to come to bear on one another when travelling at zero or virtually zero pressure and thus to participate in bearing the load.

This groove also has the same advantage in the case of a tire such as described in U.S. Pat. No. 5,785,781, the subject matter of which is hereby incorporated herein by reference.

The tire according to the invention also has the advantage of being able to effect, for one and the same dimension of tire fitted on a given vehicle, substantial lightening of the mounted assembly comprising a mounting wheel, the tire and means making it possible to avoid bulging of the crown of the tire when, on a vehicle, the pressure in the mounted assembly is zero or virtually zero.

The bulging of the crown occurs in that part of the tire which comes into contact with the roadway once the crown having a dual curvature (circumferential and transverse) is no longer applied against the roadway by the internal inflation pressure; there then takes place a sudden variation in curvature, the tire only touching the roadway over the periphery of the imprint.

In the aforementioned international application No. PCT/EP 99/10471, the mounted assembly illustrated comprises a tire mounted on a rim having seats of different diameters and an internal support ring bearing on a cylindrical bearing surface. It is noted that the greatest width of the mounted assembly is given by the axially outermost points of the bead and of the rim. It will be noted that the support ring, in order to be effective, must be sufficiently wide both to block the heel of one of the beads and to support the median part of the tire while reducing the risks of bulging of the crown when travelling at zero pressure. It is advantageous to be able to produce a lighter mounted assembly compared with this last-mounted assembly, retaining the functional characteristics of this assembly, by reducing the width of the rim measured between the axially outermost points.

To this end, there is proposed a rolling assembly formed of a tire according to the invention, a mounting rim and means limiting the bulging of the tire when travelling at zero pressure.

This rolling assembly comprises:

a tire comprising a crown, sidewalls and beads, each bead having a seat having a generatrix, the axially inner end of which lies on a circle of diameter greater than the diameter of the circle on which the axially outer end is located, the bead heel being axially to the inside, whereas the bead toe is axially to the outside, and a radial carcass reinforcement winding within each bead around at least one inextensible, annular heel reinforcement element which is coated with rubber mix, passing from the inside to the outside to form an upturn, extending into a profiled element of rubber mix in the form of a wedge having a Shore A hardness greater than the Shore A hardness(es) of the rubber mixes respectively radially above the element and the axially adjacent profiled element, the meridian profile of the carcass reinforcement, when the tire is mounted on its operating rim and inflated to the recommended pressure, has a constant direction of curvature in each bead and in the sidewalls extending them radially and has a tangent TT' to the point of tangency T of the profile with the annular element of each bead which forms with the axis of rotation an angle $\phi$ which is open towards the outside and is between 45° and 70°;

a rim comprising two frustoconical seats, the generatrix of each seat forming with the axis of rotation an angle $\alpha$ of between 4° and 30°, the axially outer end of a generatrix being distant from the axis of rotation by a quantity less than the distance from the axially inner end, the frustoconical seats being defined axially to the outside by protrusions having frustoconical axially inner walls, the rim furthermore comprising support means intended at least to prevent the bulging of the crown of the tire, that is to say, means for forcing the crown to remain in contact with the ground under conditions of travel at zero pressure, the assembly being characterized in that, when the tire is mounted on its rim and inflated to its operating pressure and is viewed in meridian section:

at least one sidewall extending a first bead comprises a profiled element having, viewed in section, substantially the form of a crescent defined by an inner face and an outer face, such profiled element extending between a point P1 and a point P2, the point P1 being located at a distance R1 greater than the external radius Rte of the armular bead element and less than the radius R0 of the circle on which are located the axially outermost points of the carcass reinforcement when the tire is inflated, the point P2 being located at a distance R2 greater than the radius R0, the distances R1 and R2 being measured perpendicular to the axis of rotation of the tire;

one of the inner or outer faces of the profiled element follows the profile of the carcass reinforcement; and the trace of the face of the profiled element opposite the face of the profiled element closest to the carcass reinforcement has a single direction of curvature.

The tire according to the invention, which has improved performance with respect to the attack of the sidewalls, makes it possible, while retaining the performance imparted by its bead structure when travelling at low or zero pressure, to effect a reduction in the maximum width of the mounting rim, which results in substantially proportional lightening. Furthermore, the reduction in the rim width involves a reduction in the width of the bearing support, the latter actually being better positioned beneath the tread of the tire (which results in turn in a saving in weight).

The presence of a profiled element in the sidewalls of the tire makes it possible, by an adaptation within the grasp of the person skilled in the art, to reduce still further the width of the support ring: in fact, the extra rigidity of the sidewalls which is imparted by the presence of the profiled elements makes it possible to reduce the width of the support since the sidewalls cooperate with the support to bear the load at zero inflation pressure and to limit the deformations under these conditions. Finally, it is possible to reduce the dimensions of the bearing support to just what is necessary to prevent the tread from "bulging" in contact with the roadway, the sidewalls on their own bearing the load at zero inflation pressure.

On the other hand, the possibility of substantially reducing the width of the mounting rim such that the beads of the tire are located axially to the inside of the axially outermost points of the sidewalls offers the advantage of easy mounting of the tire on the rim which, in particular, no longer necessarily requires the presence of a mounting groove on the rim. This type of mounting is described, for example, in U.S. Pat. No. 5,836,366. There results simplification of the manufacture of the rim and a consequent reduction in the manufacturing costs. In order to go further towards an additional reduction in the weight of the rolling assembly, it is advantageous to provide for the seats of the rim to have identical rim diameters.

BRIEF DESCRIPTION OF THE DRAWINGS

Other characteristics and advantages of the invention will become apparent from the description given hereafter with reference to the appended drawings, which show in non-limitative manner embodiments of a tire according to the invention which, associated with a suitable rim, forms a tire/rim assembly. In the drawings.

DETAILED DESCRIPTION OF EXEMPLARY EMBODIMENTS

Figure 1:
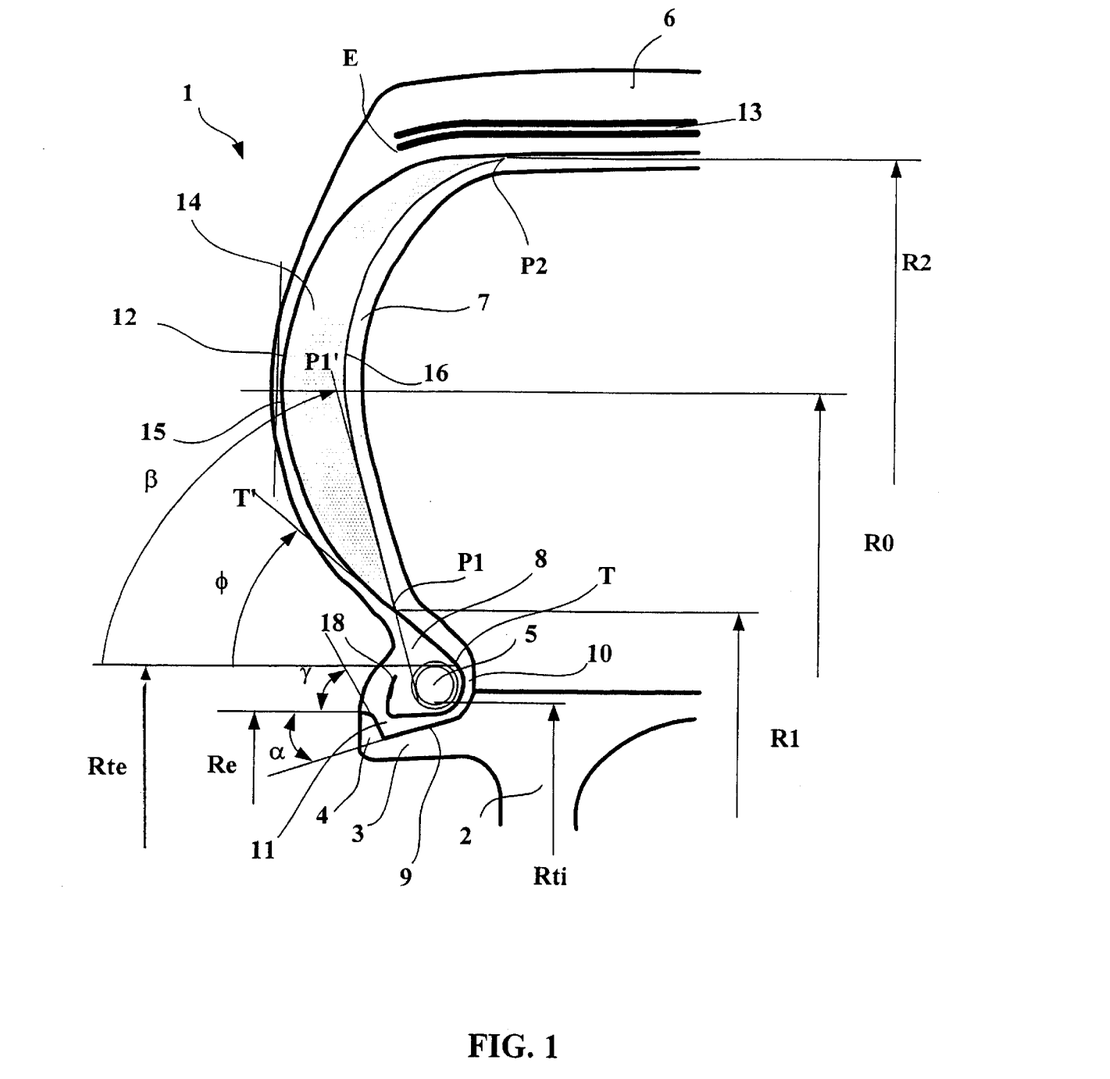
FIG. 1 is a diagram of a partial meridian section through a tire according to the invention, showing a bead and a sidewall extended by a crown, this tire being mounted on a mounting rim.

FIG. 1 shows only part of a tire 1 according to the invention mounted on a mounting rim 2. The rim 2 on which the tire 1 is mounted comprises a frustoconical seat 3, the generatrix of which forms with the axis of rotation an angle α inclined towards the outside of the tire, of between 4° and 30°, and in the example described 10°, less than the angle of the corresponding generatrix of the seat of the bead of the tire. The seat 3 has its axially outer end on a circle of smaller diameter than that of the circle on which its axially innermost end is located. The seat 3 is extended axially to the outside by a protrusion or flange 4, the inner face of which forms with the axis of rotation an angle γ. The radius Re of the flange 4 is less than the internal radius Rti of the reinforcing bead wire 5 of the bead mounted on the seat 3.

FIG. 1 shows part of a tread 6 of the tire 1 which is connected by a sidewall to a bead 8, the seat 9 of which has a generatrix whose axially inner end is on a circle of a diameter greater than the diameter of the circle on which the axially outer end is located. The heel 10 of the bead 8 is axially to the inside, while the toe 11 of the bead 8 is to the outside. The tire 1 is reinforced by a radial carcass reinforcement 12 surmounted radially by a crown reinforcement 13 composed of two superposed plies. The carcass reinforcement 12 is formed of a single ply of textile cables which is anchored in the bead 8 by turning up about the inextensible annular reinforcement element 5 (here, a bead wire of "braided" type), passing from the inside towards the outside to form an upturn 18 extending into a profiled element of rubber mix in the form of a wedge having a Shore A hardness greater than the Shore A hardness(es) of the rubber mixes respectively radially above the profiled element and the axially adjacent profiled element. When the tire 1 is mounted on its rim 2 and inflated to its recommended use pressure (as is the case in FIG. 1), the carcass reinforcement 12 adopts a meridian profile which does not have any change of sign of its curvature (i.e. is without a point of inflection) between the point of tangency T with the annular element 5 and the connection with the crown reinforcement (corresponding to the axially outermost point E of the widest crown ply). Furthermore, this profile has a tangent TT' to the point of tangency T with the annular element 5 which forms with the axis of rotation of the mounted assembly an angle Φ which is open towards the outside and is between 45° and 70°.

The sidewall 7 comprises a profiled element 14 made of rubber mix having, in the plane of FIG. 1, a crescent-shaped section, the points P1 and P2 of which are on circles of radius R1 and R2, respectively, where R1 is between the external radius Rte of the annular element 5 and the radius R0 of the circle on which are located the points of the carcass reinforcement which are axially most to the outside of the tire when mounted on its rim 2 and inflated to its use pressure, and R2 is greater than the radius R0.

Furthermore, the profiled element 14 comprises two faces, a first face 15 axially to the outside which follows the shape of the carcass reinforcement 12, and a second face 16 axially to the inside, the trace of which in the plane of FIG. 1 has a curvature of constant sign between P1 and P2, and the tangent of which to the point P1 closest to the bead forms with the axis of rotation an angle β greater than 70° (in the present case, the angle P is equal to 80°).

In order not to create an excess thickness which might have adverse consequences on the endurance of the tire under conditions of travel at zero pressure while maintaining good resistance of the sidewall 7 to attack, it is preferably, as is shown in this FIG. 1, for the point P1 to be selected such that the tangent P1'P1 to the trace of the inner face 16 of the profiled element 14 at the point P1 is such that it is also tangent to the bead wire of the bead 5 on the axially outer part of the bead reinforcement. In this manner, it is possible, while having a profiled element which ensures effective protection of the sidewall, to avoid thickening of that part of the tire located at the junction of the sidewall and the bead and to maintain a zone of articulation in the vicinity of P1.

The profiled element 14 used is made here of a rubber mix, the mechanical properties of which are selected to be compatible with the rubber mixes forming the tire and in particular with the mix of the carcass reinforcement. The maximum thickness of the profiled element 14 is preferably located in the axially widest region of the tire (that is to say, at the points of the tire on the circle of radius R0).

The tire described with reference to FIG. 1 comprises a second sidewall ending in a second bead (not shown). The second sidewall may also comprise a reinforcing profiled element which may be identical in dimensions and in position, or alternatively different. Likewise, the second bead may be of a different diameter or of the same diameter and may or may not be of a construction similar to the construction of the first bead, that is to say, having a seat the generatrix of which has an axially inner end on a circle of diameter greater than the diameter of the circle on which the axially outer end is located.

Figure 2:
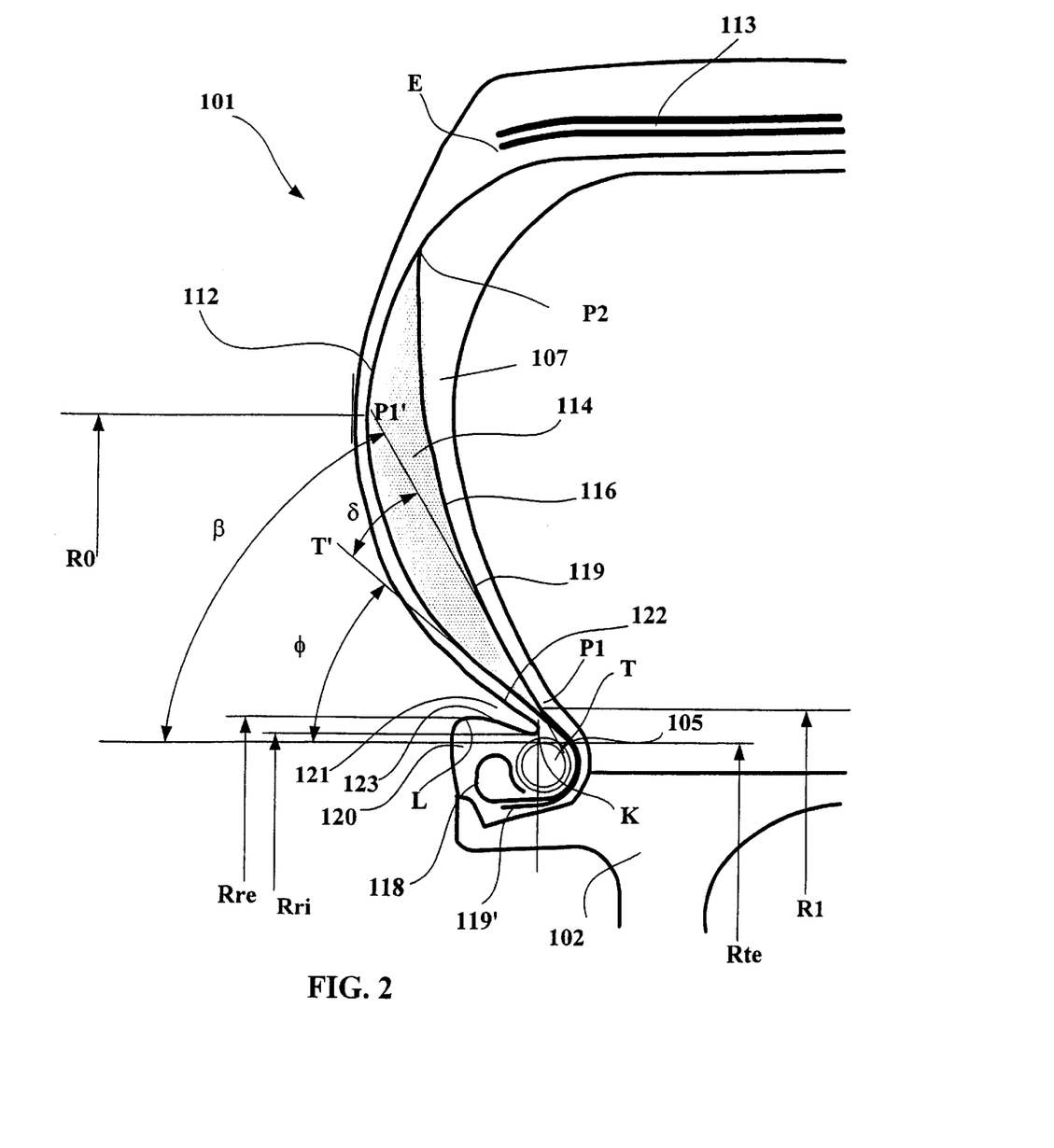
FIG. 2 shows a meridian section through a tire variant according to the invention mounted on its mounting rim.

In the variant illustrated in FIG. 2, there can be seen only part of a tire 101 according to the invention mounted on a rim 102, the tire comprising a carcass reinforcement 112 which winds about a bead wire 105, passing from the inside towards the outside to form a loop 118. A crescent-shaped protective profiled element 114 which is continuous circumferentially is provided in the sidewall 107 on the inside of the carcass reinforcement 112 and extends between a point P1 fairly close to the point of tangency T of the carcass reinforcement with the bead wire (that is to say, being at a distance R1 from the axis of rotation of between Rte and (3Rte+R0)/4) and a point P2 located in the sidewall of the tire between the point of the sidewall of radius R0 which corresponds to the axially outermost point of the carcass reinforcement 112 of the inflated tire and the end point E of the crown plies 113. The inner face 116 of the protective profiled element 114 is covered with a reinforcement armature 119 extending between P1 and P2 so as to increase the rigidity of the profiled element 114 under forces directed axially from the outside to the inside of the tire. The inner face 116 of the profiled element 114 has at P1 a tangent P1P1' which forms an angle β greater than 70° with the axis of rotation.

In combination with this arrangement of the profiled element 114 which extends within the sidewall into the vicinity of the annular element 105 of the bead, it is preferable to provide in that part of the bead 120 covering the carcass upturn 118 radially towards the outside a decoupling groove 121 oriented in the circumferential direction. The groove 121 is defined by a radially inner surface 123 and a radially outer surface 122 such that, viewed in section, the point of intersection K of the two surfaces 123, 122 is located at a distance Rri from the axis of rotation of the tire which is substantially between R1 and Rte, the point K being axially to the inside relative to the axially outermost point of the bead wire 105. The point of intersection K of the radially inner and outer surfaces 123, 122 is determined as the point of tangency of such surfaces with a straight line perpendicular to the axis of rotation.

Furthermore, the radially inner surface 123 defining the groove 121 has a point L axially and radially to the outside and which is located at a distance Rre from the axis of rotation that is greater than or equal to the distance Rri, and the profiles of the surfaces 122 and 123 defining the groove 121 are appropriate for such surfaces to come to bear on one another when travelling at zero or virtually zero pressure.

In this manner, it is possible, for travel under rated conditions at a pressure other than zero, to reduce the effect of the presence of a profiled element 114 in the sidewall, and in particular in the vicinity of the bead, by the presence of a decoupling groove, while permitting bearing of the radially upper surface on the radially inner surface when travelling at reduced or zero pressure.

The adjustment of this bearing action, which is within the grasp of the person skilled in the art, is a function of the width and profile of the groove decoupling.

In the case in question, the reinforcement 119 covering the inner face of the profiled element 114 is a ply formed of a plurality of cords or cables arranged parallel to each other and being of the same direction as the reinforcements of the carcass reinforcement 112. Advantageously, the ply 119 covering the profiled element 114 is extended radially below the point P1 so as to follow the profile of the carcass reinforcement and to wind around the bead wire 105 to form an upturn 119' so as to ensure better cohesion of the tire and better anchoring of the sidewall of the tire to the bead.

The angle δ between the tangent TT' to the carcass reinforcement at the point of connection with the bead reinforcement armature 105 and the tangent P1P1' to the inner face of the profiled element 114 at the point P1, is greater than 20°. The maximum thickness of the profiled element 114 is located substantially radially beneath the point of the carcass reinforcement of radius R0.

Figure 3:
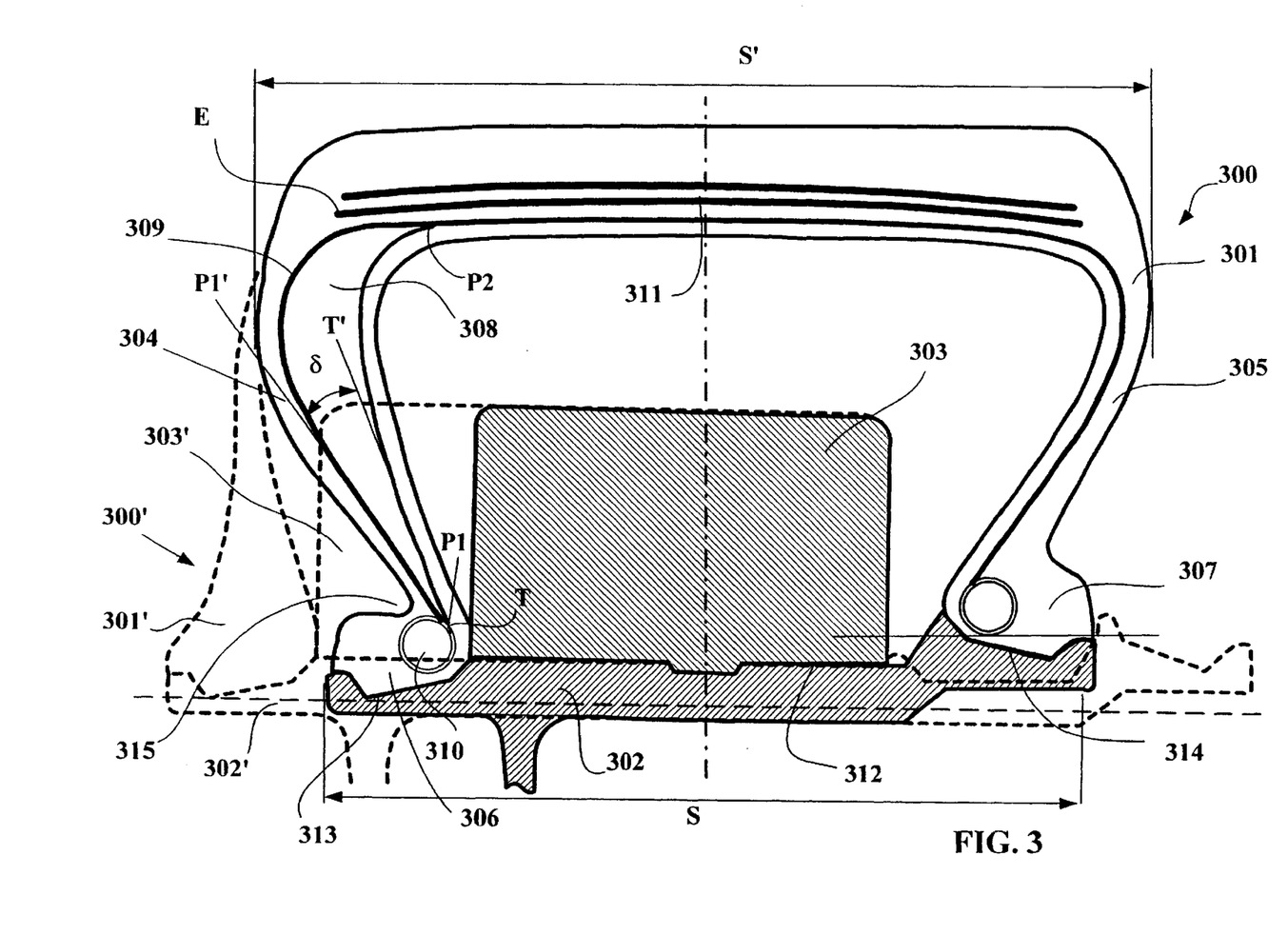
FIG. 3 shows a meridian section through a mounted assembly composed of a tire according to the invention, its mounting rim and a bearing support.

FIG. 3 shows, in unbroken lines, a meridian section through a mounted assembly 300 comprising a tire 301 according to the invention mounted on a mounting rim 302 and further comprising an inner support ring 303. In this same FIG. 3, there is shown in broken lines an equivalent mounted assembly 300', that is to say, one provided for one and the same use, according to the prior art comprising a tire 301', a mounting rim 302' and a support ring 303'. The rim 302' of the prior art assembly comprises two rim seats of different diameters, each seat, of frustoconical form, having a generatrix which forms with the axis of rotation an angle, inclined towards the outside of the tire, of between 4° and 30° less than the angle of the corresponding generatrices of the seats of the beads of the tire 301'. The seats thus have axially outer ends on circles of smaller diameters than those of the circles on which the axially inner ends are located. Each seat of the rim 302' of the prior art is extended axially towards the outside by a protrusion or hump, the axially outer face of which determines the maximum width of the mounted assembly, as can clearly be seen in FIG. 3.

The overall width of the mounted assembly 300' according to the prior art is determined by the width between the outer points of the beads of the tire 301'.

The mounted assembly 300 according to the invention is shown in unbroken lines and comprises a tire 301, a rim 302 and a support ring 303. The tire 301 comprises a first and second sidewalls 304, 305 and first and second beads 306, 307 of different structure. The first sidewall 304 of the tire, which is intended to be placed on the outside of a vehicle, comprises a reinforcing profiled element 308 in order to protect the sidewall against attack, the profiled element 308 being arranged axially to the inside of the carcass reinforcement 309. This crescent-shaped profiled element 308 is made of rubber mix and extends between a point P1 which is substantially identical to the point of tangency T of the carcass 309 with the bead reinforcement element 310 and a point P2 axially to the inside relative to the end E of the crown plies 311. The second sidewall 305, which is intended to be placed to the inside of the vehicle, does not comprise a reinforcing profiled element and is extended by the second bead 307, the internal development of which is greater than the development of the first bead 306.

Similarly to the mounted assembly 300' of the prior art, there is provided an inner ring 303 which is slipped on to a bearing surface 312 of the rim provided axially between the rim seats 313, 314. This inner ring 303 is intended both to avoid bulging of the crown of the tire during travel at zero pressure and also to bear the load of the tire in this configuration. As is shown, the tire is provided radially above the first bead 306 with a groove 315 which opens towards the outside of the tire, such groove ensuring great flexibility for the sidewall 304 provided with a reinforcing profiled element 308 in the vicinity of the lower point P1 of said profiled element.

The tire assembly 300 has an overall width S' substantially equivalent to the overall width of the mounted assembly 300' of the prior art, except for the fact that the overall width S' corresponds to the distance measured parallel to the axis of rotation between the points of the sidewalls 304, 305 which are axially farthest away when the tire is mounted on its rim and inflated. The width S' is greater than the width S measured between the axially outermost points of the rim 302. The reduction in width of the rim and the reduction of the width of the support ring in accordance with the invention very largely compensate for the increase in weight linked to the presence of a profiled element in the sidewall (s), which results in an overall reduction in the total weight of the mounted assembly 300 compared with the weight of the mounted assembly 300' of the prior art.

Figure 4:
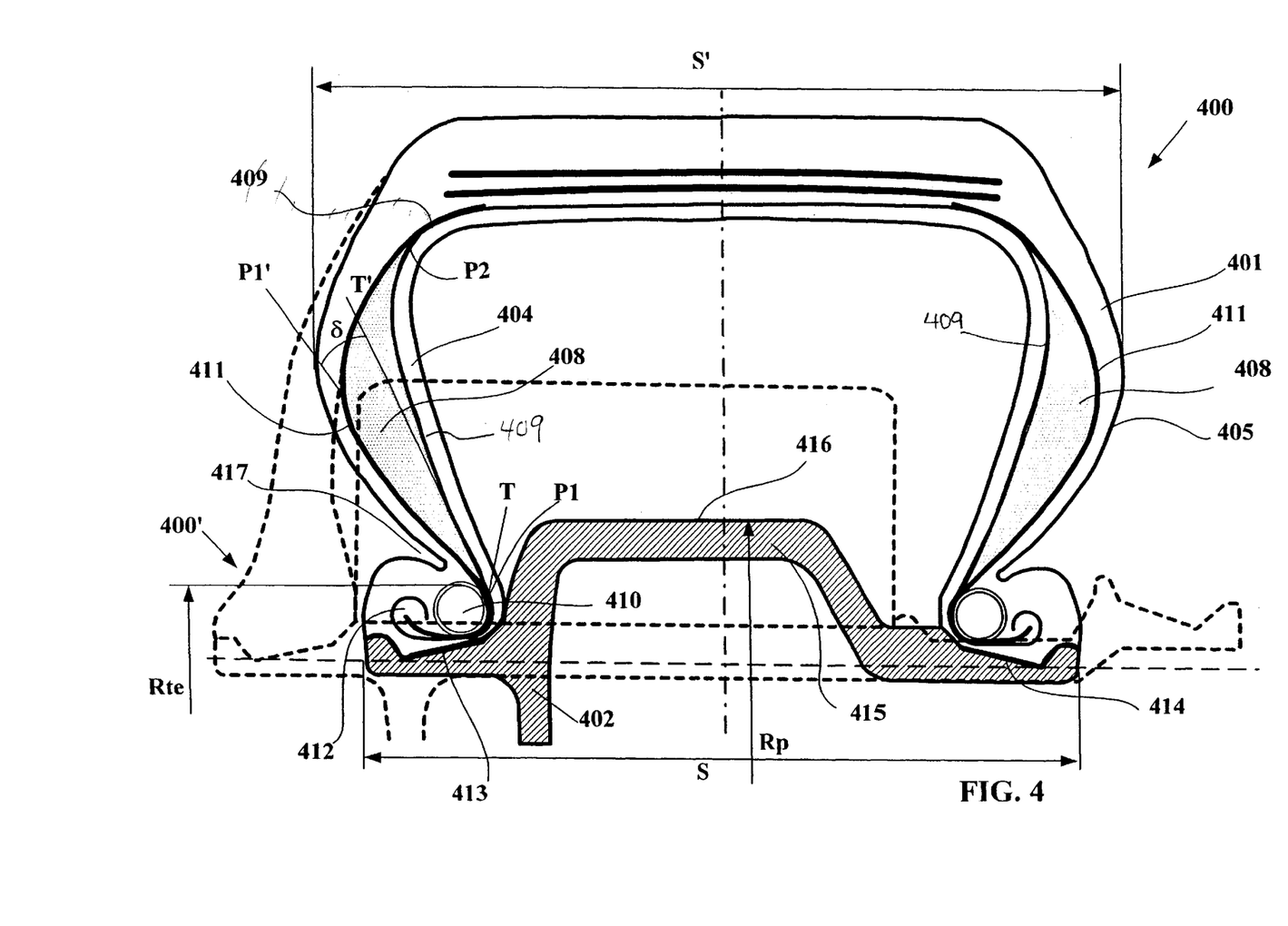
FIG. 4 shows a meridian section through a variant of a mounted assembly composed of a tire according to the invention and a mounting rim.

In another variant of a mounted assembly 400 according to the invention which is shown in FIG. 4, it is proposed not to use a support ring. In FIG. 4, there has been shown in broken lines a mounted assembly 400' according to the prior art (identical to that also shown in broken lines in FIG. 3), in which the rim comprises seats of different diameters. The variant of the mounted assembly 400 according to the invention shown inflated in unbroken lines comprises a tire 401, which is symmetrical relative to a median plane perpendicular to the axis of rotation, mounted on a rim 402 having seats 413, 414 of the same diameter. Each sidewall 404, 405 comprises a carcass reinforcement 409, the meridian profile of which has a direction of curvature which is constant within the bead and within the sidewall and has a tangent TT' to the point of tangency T of the profile with an annular element 410 of the bead which forms with the axis of rotation an angle open towards the outside of 70°.

In the variant in question, a sidewall reinforcing profiled element 408 is positioned axially on the outside of the carcass reinforcement 409. The angle δ between the tangent TT' to the carcass reinforcement 409 at the point of tangency T and the tangent P1P1' at the point P1 to the profiled element 408 on that face of the profiled element 408 which is not in contact with the carcass reinforcement 409 is equal to 20°. The profiled element 408 is furthermore covered on its axially outermost face with a reinforcement armature 411 which is extended radially towards the inside relative to said profiled element 408 along the carcass reinforcement 409 into the rubber wedge 412 in which the upturn of the carcass reinforcement 409 is embedded; in this manner, better hooking of the profiled element 408 to the carcass reinforcement 409 and to the bead wire 410 of the bead is ensured. Furthermore, the reinforcement armature 411 is extended along the carcass reinforcement 409 radially beyond the point P2.

Since the point P1 is located substantially in the vicinity of the point of tangency of the profile of the carcass reinforcement 409 with the annular bead element 410, it is advantageous to provide each bead with a groove 417 which is open axially towards the outside and radially above the bead toes so as to compensate for the excess thickness due to the profiled element 408 and to form a sort of articulation close to P1.

The mounting rim 402 comprises seats 413, 414 of the same diameter, each having a generatrix which forms with the axis of rotation an angle inclined towards the outside of the tire 401. Axially between the two rim seats 413, 414 there is formed a circumferential rib 415 having, radially to the outside, a cylindrical surface 416, the radius Rp of which is greater than the largest of the distances of the axially innermost points of the generatrices of the frustoconical seats 413, 414 of the rim 402. The sidewalls 404, 405 of the tire according to the invention each comprise a reinforcing profiled element 408 which participates in bearing the load under conditions of travel at zero pressure, the function of the rib 415 provided on the rim 402 being to limit the bulging of the crown of a tire mounted on the rim and travelling at zero pressure. Such an arrangement makes it possible to avoid the use of a support ring.

Preferably, the radius Rp of the points of the rib which are radially farthest from the axis of rotation is greater than the radius Rte of the radially farthest points of the annular bead element, so as to have a sufficient action to avoid bulging of the crown of the tire. This function is accomplished if the difference between the radius Rp and the radius Rte is at least 5 mm.

In the image of what has been described with the variant of FIG. 3, the overall width S' of the tire assembly 400 is greater than the overall width S of the mounting rim 402.

The reduction in width of the rim made possible by using a tire according to the invention makes it possible to produce a rim which does not necessarily have a mounting groove.

Figure 5:
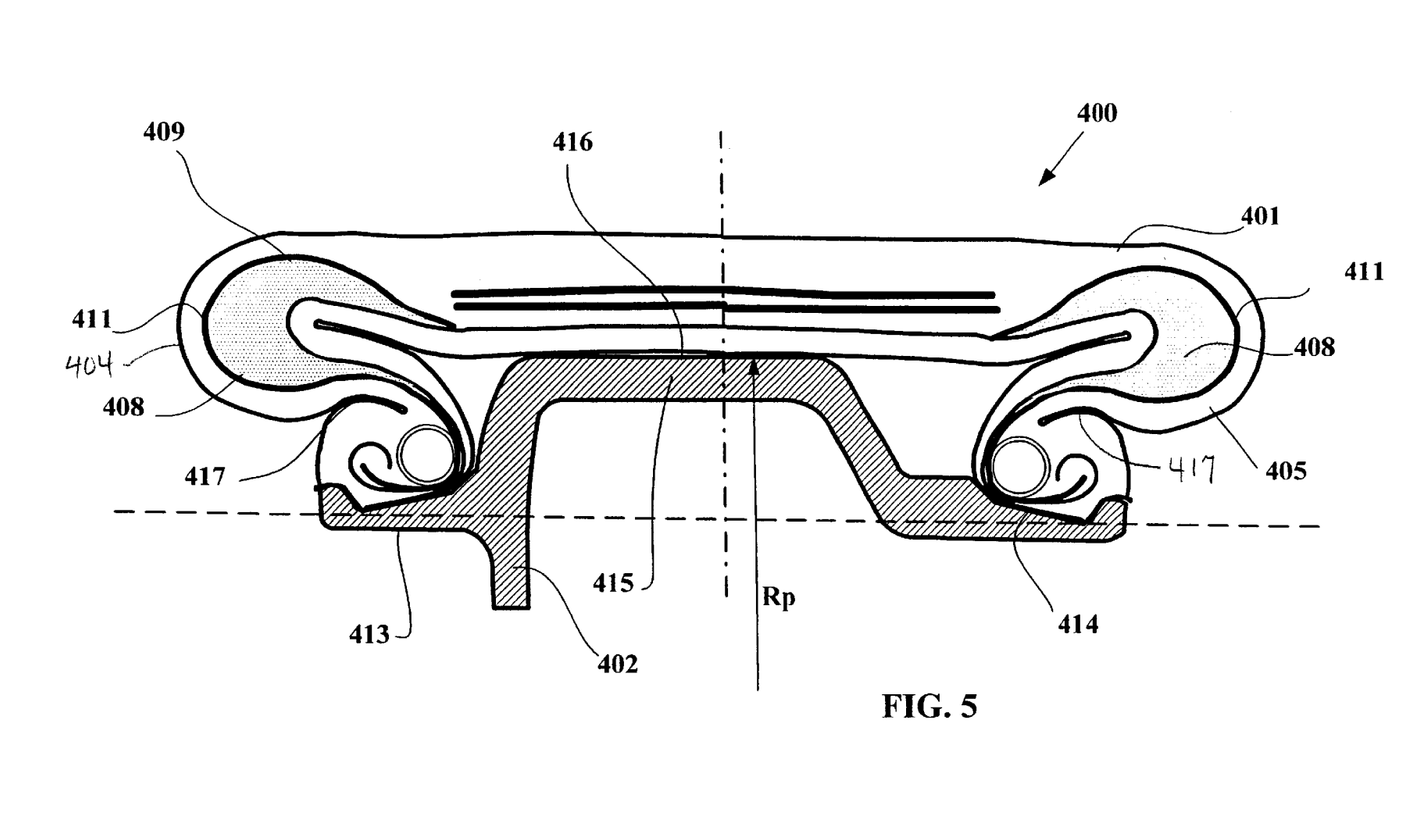
FIG. 5 shows a meridian section through the variant of the mounted assembly of FIG. 4 in a loaded configuration, the tire not being inflated.

In FIG. 5, there is shown a meridian section of the mounted assembly 400 which is identical to that shown in FIG. 4 when this assembly 400 has a zero inflation pressure and is subjected to a given load (the references used are identical to those of FIG. 4 and refer to the same elements). In this highly loaded configuration, it can be seen that the highly curved sidewalls 404, 405 are bearing on the toes of the beads, whereby the grooves 417 have closed up and the radially outer and inner walls defining the grooves 417 are bearing on one another. In this manner, since the tire is not inflated, the load is supported essentially by the sidewalls and the beads. Furthermore, it can also be seen that the radially outer surface 416 of the rib 415 of the rim 402 is locally in contact with the inner part of the crown of the tire. This prevents the crown from passing into a countercurvature, and thus forces it to remain in contact with the roadway. The combination of the sidewalls 404, 405 provided with profiled elements 408 protecting the sidewalls from external attack and with the beads having generatrices which are open towards the outside makes it possible to produce a very high-performance tire assembly, whether when travelling under rated use conditions or under conditions of travel at low or even zero pressure.

In fact, when a tire is deflated, it becomes particularly susceptible to external attack (the non-reinforced sidewalls being easily damaged by various objects, all the more so since they are not tensioned by the inflation pressure). It is therefore particularly advantageous to provide a tire with reinforcement profiled elements in the sidewalls according to the invention.

Although the invention has been described and illustrated herein by reference to specific embodiments thereof, it will be understood that such embodiments are susceptible of modification and variation without departing from the inventive concepts disclosed. All such modifications and variations, therefore are intended to be included within the spirit and scope of the appended claims.

What is claimed is:

1. A tire comprising at least a first bead, the seat of which has a generatrix whose inner end lies on a circle of diameter greater than the diameter of the circle on which the axially outer end is located, the bead heel being axially to the inside and the bead toe being axially to the outside, and a radial carcass reinforcement winding within each bead around at least one inextensible, annular heel reinforcement element which is coated with rubber mix, the carcass reinforcement passing around the annular heel-reinforcement element from the inside to the outside to form an upturn which extends into a profiled element of rubber mix in the form of a wedge having a Shore A hardness greater than the Shore A hardness (es) of the rubber mixes respectively radially above said profiled element and the axially adjacent profiled element, the meridian profile of the carcass reinforcement, when the tire is mounted on its operating rim and inflated to the recommended pressure, having a direction of curvature which is constant in the first bead and the sidewall extending radially therefrom and having a tangent TT' to the point of tangency T of said profile with the annular element of said first bead which forms with the axis of rotation an angle φ which is open towards the outside of between 45° and 70°, wherein said tire, viewed in meridian section, further comprises:

- at least the sidewall extending the first bead comprises a profiled element having, viewed in section, substantially the form of a crescent defined by an inner face and an outer face, said crescent-shaped profiled element extending between a point P1 and a point P2, the point P1 being located on a circle of radius R1 greater than the external radius Rte of the annular bead element and less than the radius R0 of the circle on which are located the axially outermost points of the carcass reinforcement of the tire mounted on its rim and inflated to its use pressure, the point P2 being located on a circle of radius R2 greater than the radius R0;
- one of the axially inner or outer faces of the crescent-shaped profiled element follows the profile of the carcass reinforcement; and
- the trace of the face of the crescent-shaped profiled element opposite the face of said crescent-shaped profiled element closest to the carcass reinforcement has a single direction of curvature.

2. The tire according to claim 1, wherein the angle δ formed by the tangent to the point P1 on said face of the crescent-shaped profiled element which is opposite the face closest to the carcass reinforcement with the tangent TT' is, in absolute value, greater than or equal to 20°.

3. The tire according to claim 1, wherein the crescent-shaped profiled element is covered with a complementary reinforcement armature intended to reinforce said crescent-shaped profiled element, over at least one part, between P1 and P2, of its face which is not in contact with the carcass reinforcement.

4. The tire according to claim 3, wherein the complementary reinforcement armature is extended radially towards the inside beyond the point P1 of the crescent-shaped profiled element along the carcass reinforcement.

5. The tire according to claim 1, wherein the radius R1 is less than (3Rte+Ro)/4 and wherein a decoupling groove which is oriented in the circumferential direction is formed axially and radially to the outside of the first bead, said groove being defined by a radially inner surface and a radially outer surface such that, viewed in section, the point of intersection K of said two surfaces is located at a distance Rri from the axis of rotation of the tire which is substantially equal to the radius R1 of the axially inner end of the crescent-shaped profiled element so as to permit bearing of the radially outer surface on the radially inner surface when the tire is travelling at reduced or zero pressure, the point of intersection K of the radially inner and outer surfaces being taken as the point of tangency of said radially inner and outer surfaces with a straight line perpendicular to the axis of rotation.

6. The tire according to claim 5, wherein, viewed in meridian section, the radially inner surface defining the groove has a point L axially and radially to the outside which is located at a distance Rre from the axis of rotation which is greater than or equal to the distance Rn and wherein the profiles of said radially inner and outer surfaces are appropriate for coming to bear on one another when the time is travelling at zero or virtually zero pressure.

7. The tire according to claim 5, wherein, viewed in meridian section, the point of intersection K of the radially inner and outer surfaces defining the groove is located axially to the inside of a straight line perpendicular to the axis of rotation and passing through the axially outermost point of the annular element.

8. The tire according to claim 1, wherein the crescent-shaped profiled element is placed in the sidewall axially to the inside of the carcass reinforcement and wherein the angle β formed by the tangent to the face of said crescent-shaped profiled element which is opposite the face of the same crescent-shaped profiled element in contact with the carcass reinforcement with the axis of rotation of the tire is greater than 700.

9. The tire according to claim 1, further comprising a second bead, the seat of which has a generatrix whose axially inner end is on a circle of diameter greater than the diameter of the circle on which the axially outer end is located, the meridian profile of the carcass reinforcement having a constant direction of curvature in the second bead and the sidewall extending it radially, and having a tangent TT' to the point of tangency T of said profile with the annular element of said second bead which forms with the axis of rotation an angle Φ which is open towards the outside and is between 45° and 70°, the sidewall extending the second bead comprising a profiled element having, viewed in section, substantially the form of a circumferentially continuous crescent and extending between two points P1 and P2, located on either side of that point of the carcass reinforcement which is axially outermost when the tire is inflated.

10. The tire according to claim 9, wherein the first and second beads seats are inclined towards the outside and are of different diameters.

11. A tire assembly formed of a tire and a mounting rim, wherein:

said tire comprises sidewalls, a crown and two beads, each bead having a seat with a generatrix whose axially inner end lies on a circle of diameter greater than the diameter of the circle on which the axially outer end is located, each bead heel being axially to the inside and each bead toe being axially to the outside, and a radial carcass reinforcement winding within each bead around at least one inextensible, annular heel reinforcement element which is coated with rubber mix, said carcass reinforcement passing around each heel reinforcement element from the inside to the outside to form an upturn which extends into a profiled element of rubber mix in the form of a wedge having a Shore A hardness greater than the Shore A hardness(es) of the rubber mixes respectively radially above said profiled element and the axially adjacent profiled element, the meridian profile of the carcass reinforcement, when the tire is mounted on its operating rim and inflated to the recommended pressure, has a constant direction of curvature in each bead and in the sidewalls extending them radially, and has a tangent TT' to the point of tangency T of said crescent-shaped profile with the annular element of each bead which forms with the axis of rotation an angle φ which is open towards the outside and is between 45° and 70°, said rim comprising two frustoconical seats, the generatrix of each seat forming with the axis of rotation an angle of between 4° and 30° and the axially outer end of each generatrix being distant from the axis of rotation by a quantity less than the distance from the axially inner end of said generatrix to said axis, said frustoconical seats being defined axially to the outside by protrusions having frustoconical axially inner walls, said rim furthermore comprising support means for preventing bulging of the crown of the tire under conditions of travel at zero pressure; and wherein, when said tire is mounted on its rim and inflated to its operating pressure and is viewed in meridian section:

at least one sidewall extending a first bead comprises a profiled element having, viewed in section, substantially the form of a crescent defined by an inner face and an outer face, said crescent-shaped profiled element extending between a point P1 and a point P2, the point P1 being located at a distance R1 greater than the external radius Rte of the annular bead element and less than the radius R0 of the circle on which are located the axially outermost points of the carcass reinforcement, the point P2 being located at a distance R2 greater than the radius R0, the distances R1 and R2 being measured perpendicular to the axis of rotation of the tire:

one of the inner or outer faces of the crescent-shaped profiled element follows the profile of the carcass reinforcement; and the trace of the face of the crescent-shaped profiled element opposite the face of said crescent-shaped profiled element closest to the carcass reinforcement has a single direction of curvature.

12. The tire assembly according to claim 11, wherein the radius R1 is less than (3Rt+Ro)/4 and the angle δ formed by the tangent to the point P1 on that face of the crescent-shaped profiled element which is opposite the face thereof in contact with the carcass reinforcement with the tangent TT' is greater than or equal to 20°.

13. The tire assembly according to claim 12, wherein a decoupling groove oriented in the circumferential direction is formed axially and radially to the outside of the first bead, said groove being defined by a radially inner surface and a radially outer surface such that, viewed in section, the point of intersection K of said radially inner and outer surfaces is located at a distance Rri from the axis of rotation of the tire which is substantially equal to the radius R1 of the profiled element so as to permit bearing of the radially outer surface on the radially inner surface when the tire is travelling at reduced or zero pressure, the point of intersection K of the radially inner and outer surfaces being taken as the point of tangency of said radially inner and outer surfaces with a straight line perpendicular to the axis of rotation.

14. The tire assembly according to claim 11, wherein the support means for preventing bulging of the crown of the tire comprise a bearing surface provided axially between the two rim seats and a support ring of suitable dimensions, said support ring being mounted on the bearing surface.

15. The tire assembly according to claim 11, wherein, when said tire is mounted on a vehicle, the sidewall provided with a profiled element is placed axially to the outside of said vehicle, so as to protect said sidewall which is located on the outside of said vehicle from attack during travel.

16. The tire assembly according to claim 11, wherein the diameters of the two rim seats are different.

17. The tire assembly according to claim 11, wherein the rim comprises, axially between the frustoconical seats, a rib forming a support, the points of said rib which are farthest from the axis of rotation being located on circles of radii Rp greater than the largest of the radii of the circles on which the axially innermost points of the frustoconical seats are located.

18. The tire assembly according to claim 17, wherein the radius Rp of the points of the rib which are radially farthest from the axis of rotation is greater than the radius Rte of the radially outermost points of the annular bead element.

19. The tire assembly according to claim 18, wherein the difference between the radius Rp of the points of the rib which are radially farthest from the axis of rotation and the radius Rte of the radially—outermost points of the annular bead element is at least 5 mm.

20. The tire assembly according to claim 11, wherein the overall width S' of the mounted assembly is greater than the width S between the axially outermost points of the rim.

21. A tire comprising at least a first bead, the seat of which has a generatrix whose axially inner end lies on a circle of diameter greater than the diameter of the circle on which the axially outer end is located, and a carcass reinforcement winding within each bead around at least one inextensible, annular heel reinforcement element which is coated with rubber mix, said carcass reinforcement passing around said heel reinforcement element from the inside to the outside to form an upturn extending into a profiled element of rubber mix in the form of a wedge having a Shore A hardness greater than the Shore A hardness(es) of the rubber mixes respectively radially above said profiled element and the axially adjacent profiled element, the meridian profile of the carcass reinforcement, when the tire is mounted on its operating rim and inflated to its operating pressure, having a direction of curvature which is constant at least in the sidewall extending said first bead and which is such that, in said bead, the tangent to the point of tangency of said carcass reinforcement profile with the inextensible annular element of the bead forms with the axis of rotation an angle φ which is open towards the outside of at least 45°, wherein, viewed in meridian section:

at least the sidewall extending the first bead comprises a profiled element having, viewed in section, substantially the form of a crescent defined by an inner face and an outer face, said crescent-shaped profiled element extending between a point P1 and a point P2, the point P1 being located, relative to the axis of rotation, at a distance R1 which is greater than the external radius Rte of the annular bead element and less than the radius R0 of the circle on which are located the axially outermost points of the carcass reinforcement of the tire mounted on its rim and inflated to its use pressure, the point P2 being located at a distance R2 greater than the radius R0, the distances R1 and R2 being measured perpendicular to the axis of rotation of the tire;

one of the axially inner or outer faces of the crescent-shaped profiled element follows the profile of the carcass reinforcement; and the trace of the face of the crescent-shaped profiled element opposite the face of said crescent-shaped profiled element closest to the carcass reinforcement has a single direction of curvature.

* * * * *